Nov. 20, 1934.    H. F. FRUTH    1,981,352
ELECTROLYTIC CONDENSER
Filed March 1, 1934
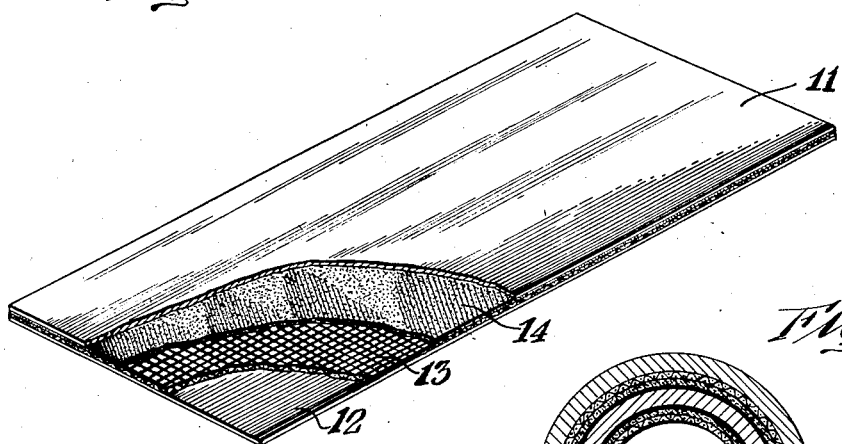
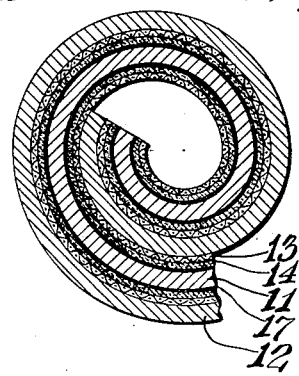
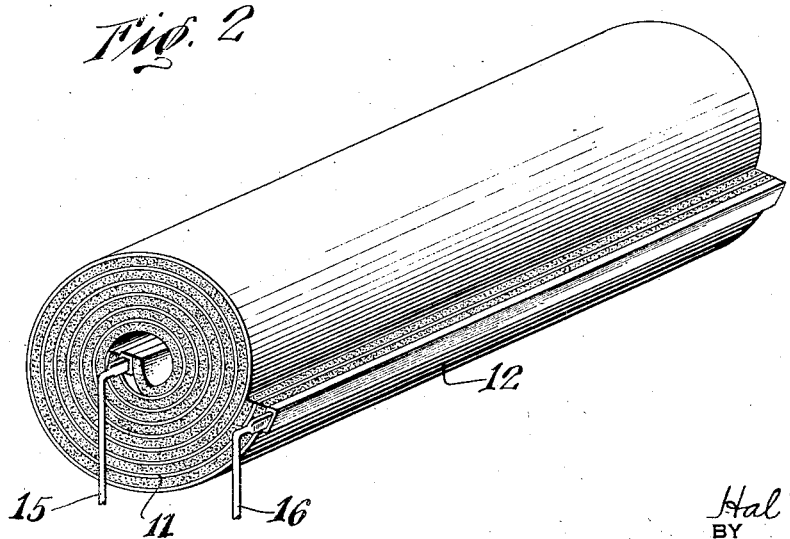
INVENTOR
Hal F. Fruth
BY
Watson, Bristol, Johnson & Leavenworth
ATTORNEYS Patented Nov. 20, 1934

1,981,352

UNITED STATES PATENT OFFICE 1,981,352

ELECTROLYTIC CONDENSER

Hal F. Fruth, Indianapolis, Ind., assignor to P. R. Mallory & Co., Incorporated, Indianapolis, Ind., a corporation of Indiana Application March 1, 1934, Serial No. 713,449

9 Claims. (Cl. 175—315)

This invention relates to electrical condensers of the so-called dry electrolytic type and, more particularly, to improvements in the type described in United States Letters Patent Number 1,918,716 of Samuel Ruben, issued July 18, 1933, and has for a general object the provision of such improvements which simplify manufacture and improve the operating characteristics and the efficiency of such condensers.

A more specific object of the invention is the provision of such condensers wherein the electrode plates or foils are separated by a laminated spacer including a reticular lamina and a flexible non-fibrous cellulose lamina with the film-maintaining electrolyte impregnating the cellulose lamina; the laminated spacer preferably being used with an electrolyte composition of paste-like consistency with an amount thereof supported in the interstices of the reticular lamina and the cellulose lamina in contact with the current-blocking film to serve the useful purposes of electrolyte impregnated conductive cellulose sheets known to the prior art.

A further object of the invention is the provision of such condensers and such spacers therein whereby the slippery and stretchable characteristics of electrolyte impregnated cellulose sheets making manufacture difficult are overcome by the reticular lamina.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a perspective view with parts broken away of an embodiment of the present invention;

Fig. 2 is a perspective view of a condenser section in roll form which embodies the features of the present invention; and Fig. 3 is an enlarged end view with parts broken away of one end of the condenser section depicted in Fig. 2 showing more clearly the preferred arrangement of parts.

Prior to the present invention it was found that dry electrolytic condensers could be greatly improved by substituting for a reticular spacer and an electrolyte composition of paste-like consistency supported in the interstices thereof, a cellulose sheet impregnated with and rendered conductive by a film-maintaining electrolyte as is indicated in the above identified United States Letters Patent of Samuel Ruben. It is therein suggested to corrugate at least one electrode so that a desired excess of electrolyte may be present. While these condensers have proved to be efficient and satisfactory, it has been found in their manufacture that the electrolyte impregnated cellulose sheets were slippery and stretchable giving rise to difficulties in manufacture.

The present invention overcomes these and other difficulties while obtaining the advantages of dry electrolytic condensers utilizing as electrode spacers cellulose sheets impregnated with a film-maintaining electrolyte. The usual electrode plates or foils at least one of which, the anode, is of film-forming metal, such as aluminum, and is provided with a current-blocking film, are separated by a laminated spacer, which includes a reticular lamina such as a scrim or sheet of gauze and a flexible non-fibrous cellulose lamina impregnated with a film-maintaining electrolyte. The cellulose lamina is preferably disposed adjacent the current-blocking film to attain the many advantages of the use of electrolyte impregnated conductive cellulose sheet spacers set forth in the above identified patent of Samuel Ruben. The reticular lamina not being slippery and stretchable avoids difficulties heretofore encountered in the manufacture of the therein described condensers and additionally provides support for a desired excess of electrolyte composition of paste-like consistency thereby obviating the use of one or more corrugated electrodes.

A sheet of flexible non-fibrous cellulose material such as regenerated cellulose or cellulose acetate when plasticized or impregnated with an electrolyte solution contracts, becomes soft and flexible and somewhat tacky, and takes an embossed appearance providing further means for the support of excess electrolyte composition, while condenser sections in roll form are being wound. The preferred electrolyte composition is of the type described in United States Letters Patent Number 1,891,207 of Samuel Ruben, issued December 13, 1932, such as a glycol-borate composition or similar electrolyte composition prepared with the use of a polyhydric alcohol falling within the classes glycols and glycerols and a weak acid such as citric, malic, lactic, tartaric, formic and phosphoric and/or their salts as is more fully described in the patent.

Referring to the drawing, like numerals refer to like parts throughout. In Fig. 1, a flat type of condenser is shown which essentially consists of an anode plate 11 of a film-forming metal, preferably aluminum, provided with a current-blocking film, a cathode plate 12 preferably also of aluminum, and a laminated spacer including a reticular lamina 13 and a flexible non-fibrous cellulose lamina 14, preferably a sheet of regenerated cellulose, such as cellophane, impregnated with an electrolyte composition.

In Fig. 2 is shown a typical condenser section in roll form embodying the present invention. The electrode plates or foils of aluminum 11 and 12 are suitably spaced apart by laminated spacers. The anode foil 11 is provided with a terminal wire 15 and the cathode foil 12 is provided with a terminal wire 16. A detailed exaggerated view of a portion of such structure is depicted in Fig. 3, showing the foil 11 provided with a current-blocking film 17. On each face thereof is disposed a laminated spacer, each including a film-maintaining electrolyte impregnated conductive cellulose lamina 14 and a reticular lamina 13 with the cellulose lamina in contact with the film-formed face of the foil 11. When this structure is rolled up with the cathode foil 12, the adjacent foil convolutions are spaced from each other by the laminated spacers as shown.

It will thus be seen that the objects set forth above are efficiently attained and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A dry electrolytic condenser comprising two electrode plates, at least one of which is provided with a current-blocking film, a laminated spacer interposed between said electrode plates consisting of a reticular lamina and a flexible non-fibrous cellulose lamina, and a film-maintaining electrolyte impregnating said cellulose lamina.

2. A dry electrolytic condenser section in roll form comprising two electrode foils, at least one of which is provided with a current-blocking film, a laminated spacer interposed between adjacent electrode foils consisting of a reticular lamina and a flexible non-fibrous cellulose lamina, and a film-maintaining electrolyte impregnating said cellulose lamina.

3. A dry electrolytic condenser comprising two electrode plates, at least one of which is provided with a current-blocking film, a laminated spacer interposed between said electrode plates consisting of a reticular lamina and a flexible non-fibrous cellulose lamina, and a film-maintaining electrolyte of paste-like consistency impregnating said cellulose lamina.

4. A dry electrolytic condenser section in roll form comprising two electrode foils, at least one of which is provided with a current-blocking film, a laminated spacer interposed between adjacent electrode foils consisting of a reticular lamina and a flexible non-fibrous cellulose lamina, and a film-maintaining electrolyte of paste-like consistency impregnating said cellulose lamina and supported in the interstices of said reticular lamina.

5. A dry electrolytic condenser section in roll form comprising two electrode foils, at least one of which is provided with a current-blocking film, a laminated spacer interposed between adjacent electrode foils consisting of a reticular lamina and a flexible non-fibrous regenerated cellulose lamina, and a film-maintaining electrolyte composition impregnating said regenerated cellulose lamina.

6. A conductive sheet spacer for dry electrolytic condensers comprising a laminated spacer consisting of a reticular lamina and a flexible non-fibrous cellulose lamina impregnated with a conductive film-maintaining electrolyte.

7. A dry electrolytic condenser comprising two electrode plates, at least one of which is provided with a current-blocking film, a laminated spacer interposed between said electrode plates including a reticular lamina and a flexible non-fibrous cellulose lamina in contact with said current-blocking film, and a film-maintaining electrolyte composition impregnating said cellulose lamina and supported in the interstices of said reticular lamina.

8. A dry electrolytic condenser section in roll form comprising two electrode foils, one of which is provided with a current-blocking film, a pair of laminated spacers each of which includes a reticular lamina and a flexible non-fibrous cellulose lamina, a film-maintaining electrolyte composition of paste-like consistency impregnating said cellulose laminæ, one of said laminated spacers being located on each face of said filmed foil with said cellulose lamina in contact with said current-blocking film.

9. A dry electrolytic condenser section in roll form comprising two electrode foils, one of which is provided with a current-blocking film, a pair of laminated spacers each of which includes a reticular lamina and a flexible non-fibrous regenerated cellulose lamina, a film-maintaining electrolyte composition of paste-like consistency containing a polyhydric alcohol falling within the classes glycols and glycerols impregnating said regenerated cellulose laminæ and supported in the interstices of said reticular laminæ, one of said laminated spacers being located on each face of said filmed foil with said regenerated cellulose lamina in contact with said current-blocking film.

HAL F. FRUTH.